US008904470B2

(12) United States Patent
Meuninck et al.

(10) Patent No.: US 8,904,470 B2
(45) Date of Patent: Dec. 2, 2014

(54) APPARATUS AND METHOD FOR MANAGING MEDIA DISTRIBUTION

(75) Inventors: Troy Meuninck, Newnan, GA (US); Ke Yu, Alpharetta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 730 days.

(21) Appl. No.: 12/327,272

(22) Filed: Dec. 3, 2008

(65) Prior Publication Data

US 2010/0138892 A1   Jun. 3, 2010

(51) Int. Cl.
*H04N 7/16* (2011.01)
*H04N 21/24* (2011.01)
*H04N 21/262* (2011.01)
*H04N 21/6338* (2011.01)
*H04N 21/232* (2011.01)
*H04N 21/2665* (2011.01)
*H04N 21/231* (2011.01)
*H04N 7/173* (2011.01)

(52) U.S. Cl.
CPC ....... *H04N 7/17336* (2013.01); *H04N 21/2402* (2013.01); *H04N 21/26258* (2013.01); *H04N 21/6338* (2013.01); *H04N 21/2326* (2013.01); *H04N 21/2665* (2013.01); *H04N 21/2407* (2013.01); *H04N 21/23106* (2013.01)
USPC ............................ 725/148; 709/226; 709/229

(58) Field of Classification Search
CPC ... H04N 21/482; H04N 21/4622; H04N 5/45; H04N 7/181

USPC ......... 725/62–73, 86–153, 38, 43, 48, 51–52, 725/59; 709/226, 229
See application file for complete search history.

(56) References Cited

U.S. PATENT DOCUMENTS

| | | | | |
|---|---|---|---|---|
| 6,212,568 | B1 * | 4/2001 | Miller et al. | 709/236 |
| 6,510,553 | B1 * | 1/2003 | Hazra | 725/87 |
| 7,159,233 | B2 * | 1/2007 | Son et al. | 725/86 |
| 7,886,318 | B2 * | 2/2011 | Wang et al. | 725/25 |
| 8,095,590 | B1 * | 1/2012 | Holm et al. | 709/201 |
| 2005/0008240 | A1 | 1/2005 | Banerji et al. | |
| 2007/0287498 | A1 * | 12/2007 | Wang et al. | 455/556.1 |
| 2008/0170622 | A1 | 7/2008 | Gordon et al. | |
| 2008/0222370 | A1 | 9/2008 | Archibald et al. | |
| 2009/0175176 | A1 * | 7/2009 | Mohan | 370/244 |

* cited by examiner

*Primary Examiner* — Yassin Alata
(74) *Attorney, Agent, or Firm* — Guntin & Gust, PLC; Ralph Trementozzi

(57) ABSTRACT

A system that incorporates teachings of the present disclosure may include, for example, a server having a controller to maintain a delivery session with a set top box for streaming of media content thereto where the media content is multiple content from a plurality of media sources, maintain retrieval sessions for each of the plurality of media sources where the controller switches between the retrieval sessions to obtain the media content while maintaining the delivery session, and temporarily store the media content in a buffer for the streaming to the set top box using the delivery session. Other embodiments are disclosed.

19 Claims, 7 Drawing Sheets

100

200

300

APPARATUS AND METHOD FOR MANAGING MEDIA DISTRIBUTION

FIELD OF THE DISCLOSURE

The present disclosure relates generally to communication systems and more specifically to an apparatus and method for managing media distribution.

BACKGROUND

Service providers often have various sources at their disposal for obtaining media content, including their own storage, an originating source, and third party providers. The available media content can be in various formats, such as depending on the content type. Users often desire to access related media content, which may or may not be directly accessible from the service provider.

DETAILED DESCRIPTION

Figure 1:
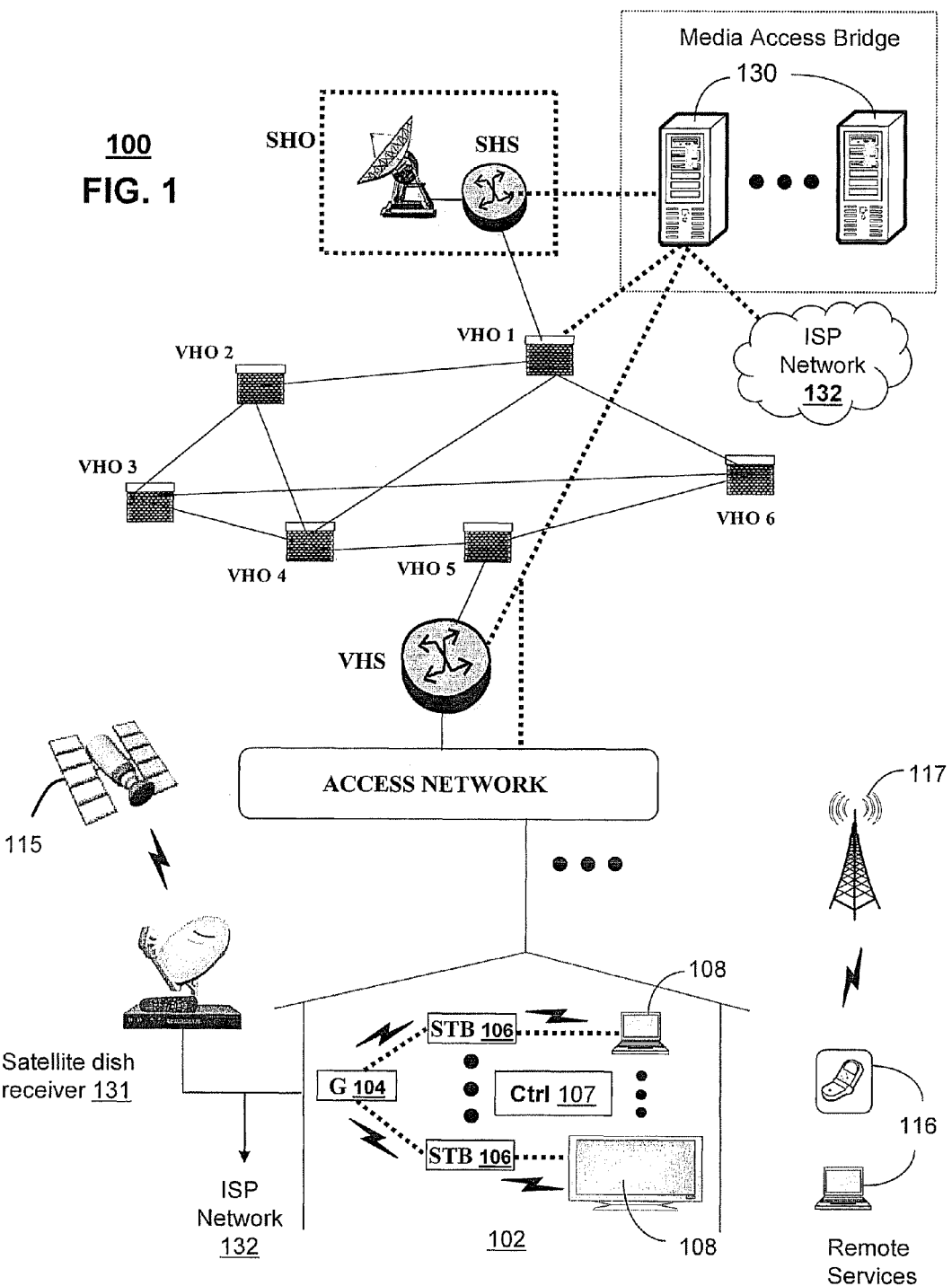
FIGS. 1-3 depict illustrative embodiments of communication systems that provide media services.

One embodiment of the present disclosure can entail a computer-readable storage medium of a network management server. The storage medium can include computer instructions for monitoring for a request for media content to be delivered to a set top box where the media content includes multiple content from a plurality of media sources, establishing a delivery session with the set top box for delivery of the media content, establishing a first retrieval session with a first media source of the plurality of media sources, obtaining a first portion of the media content from the first media source using the first retrieval session, providing the first portion of the media content to a circular buffer, streaming the first portion of the media content to the set top box from the circular buffer using the delivery session, establishing a second retrieval session with a second media source of the plurality of media sources, obtaining a second portion of the media content from the second media source using the second retrieval session, and providing the second portion of the media content to the circular buffer.

Another embodiment of the present disclosure can entail a server having a controller to a server having a controller to maintain a delivery session with a set top box for streaming of media content thereto where the media content is multiple content from a plurality of media sources, maintain retrieval sessions for each of the plurality of media sources where the controller switches between the retrieval sessions to obtain the media content while maintaining the delivery session, and temporarily store the media content in a buffer for the streaming to the set top box using the delivery session.

Yet another embodiment of the present disclosure can entail a network element having a controller to maintain a delivery session with a set top box for streaming of media content thereto where the media content comprises multiple content from a plurality of media sources, maintain retrieval sessions for each of the plurality of media sources where the retrieval sessions are being switched between to obtain the media content while maintaining the delivery session, and maintain the media content in a buffer for the streaming to the set top box using the delivery session.

Yet another embodiment of the present disclosure can entail a server having a controller to establish a delivery session with a set top box for streaming of media content thereto, wherein the media content comprises multiple content from one or more media sources, establish a plurality of retrieval sessions with the one or more media sources, obtain the media content from the one or more media sources by switching between retrieval sessions while maintaining the delivery session, and provide the media content to a buffer for the streaming to the set top box using the delivery session.

Yet another embodiment of the present disclosure can entail a method including establishing a delivery session with a set top box for delivery of media content where the media content includes multiple content from a plurality of media sources, establishing a first retrieval session with a first media source of the plurality of media sources, obtaining a first portion of the media content from the first media source using the first retrieval session, providing the first portion of the media content to a buffer, streaming the first portion of the media content to the set top box from the buffer using the delivery session, establishing a second retrieval session with a second media source of the plurality of media sources, obtaining a second portion of the media content from the second media source using the second retrieval session, providing the second portion of the media content to the buffer, and streaming the second portion of the media content to the set top box from the buffer using the delivery session.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

In one embodiment, the computing devices 130 can comprise a media bridge for retrieving media content from multiple sources using multiple IP retrieval sessions while maintaining a single delivery session with the set top box. For example, the devices 130 can utilize a buffer, such as a circular buffer, as a repository for the packets of the multiple media content that are being received from the different media sources through the multiple sessions established between the bridge and the plurality of media sources. The bridge can determine the bandwidth requirements for delivery of the media content, and can adjust the bandwidth, including bandwidth negotiations, to maintain streaming of the multiple media content to the set top box.

Figure 2:
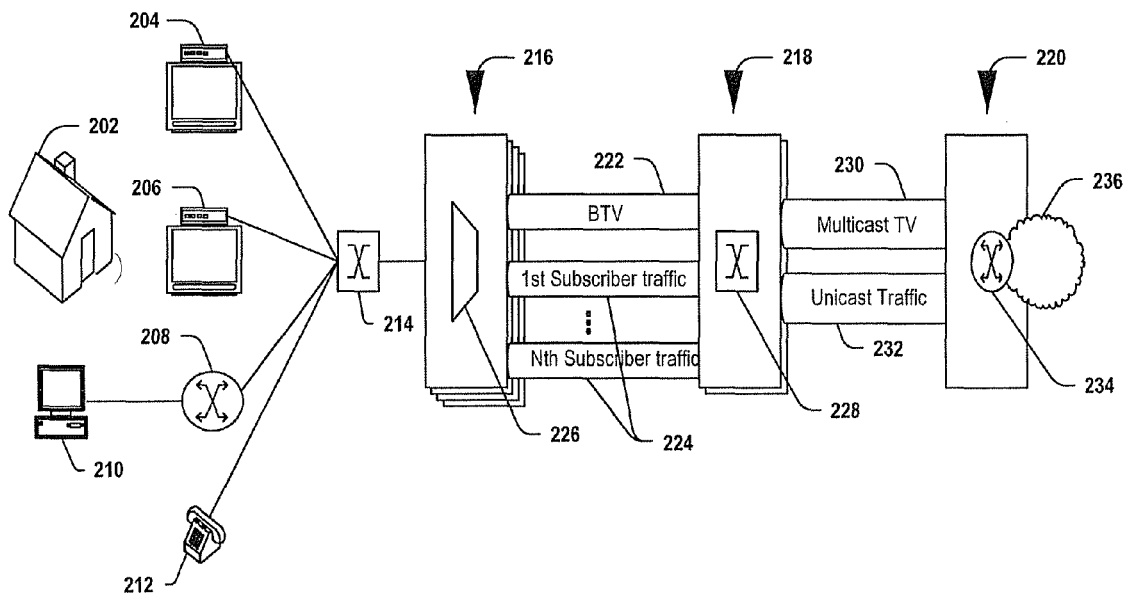

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
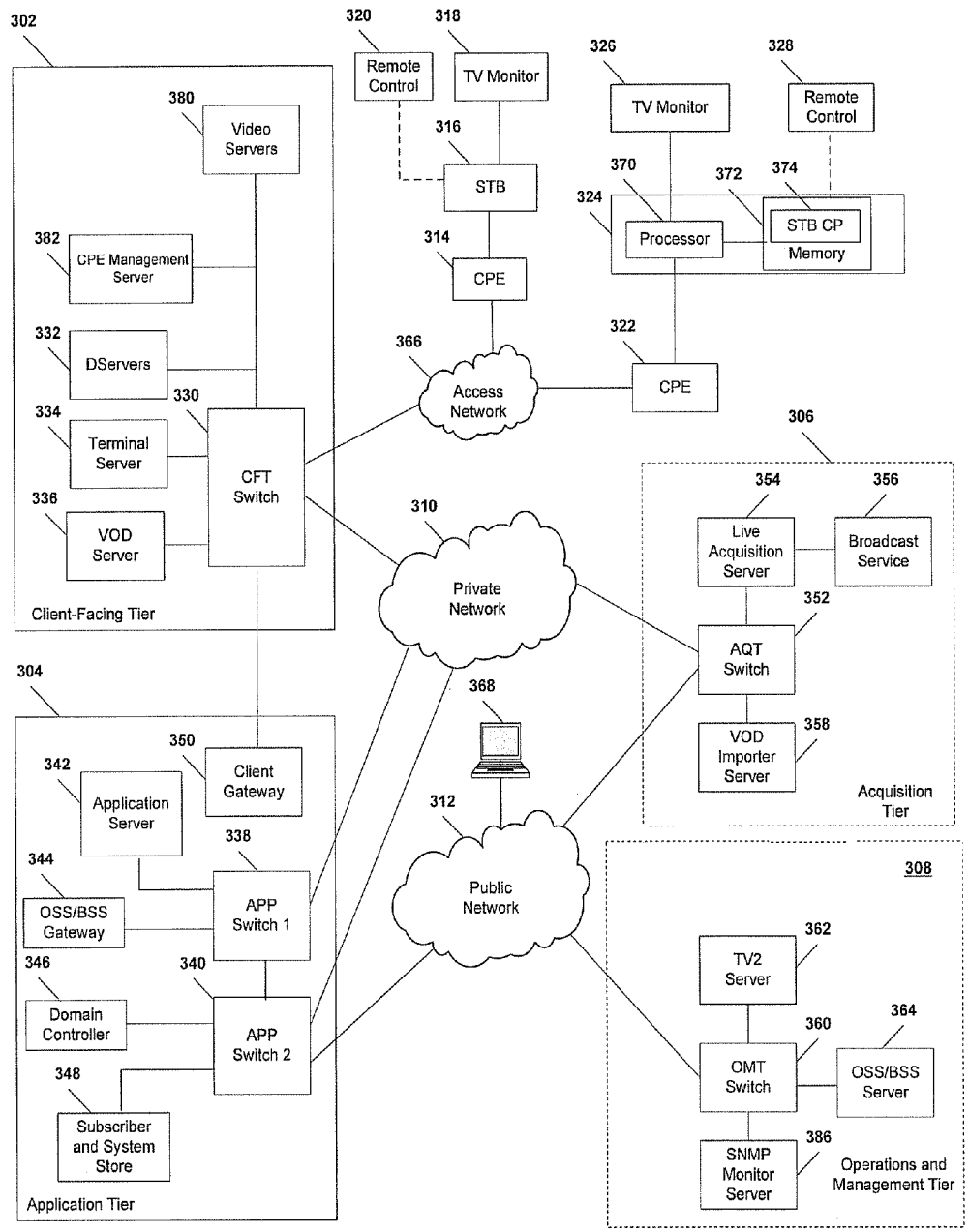

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
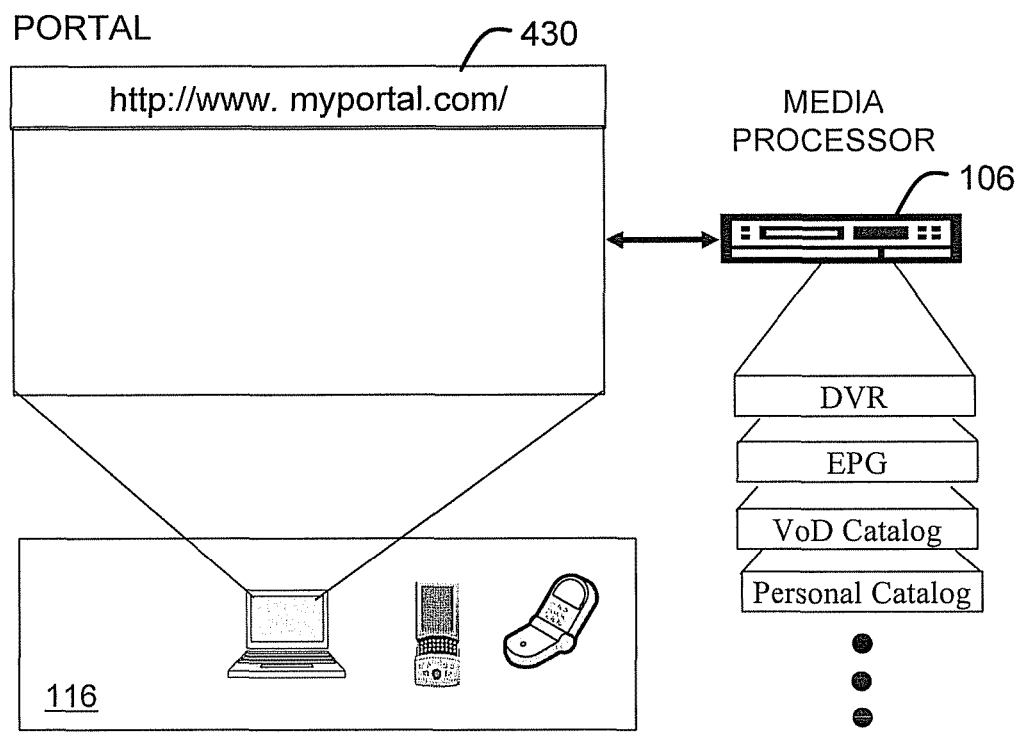
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 5:
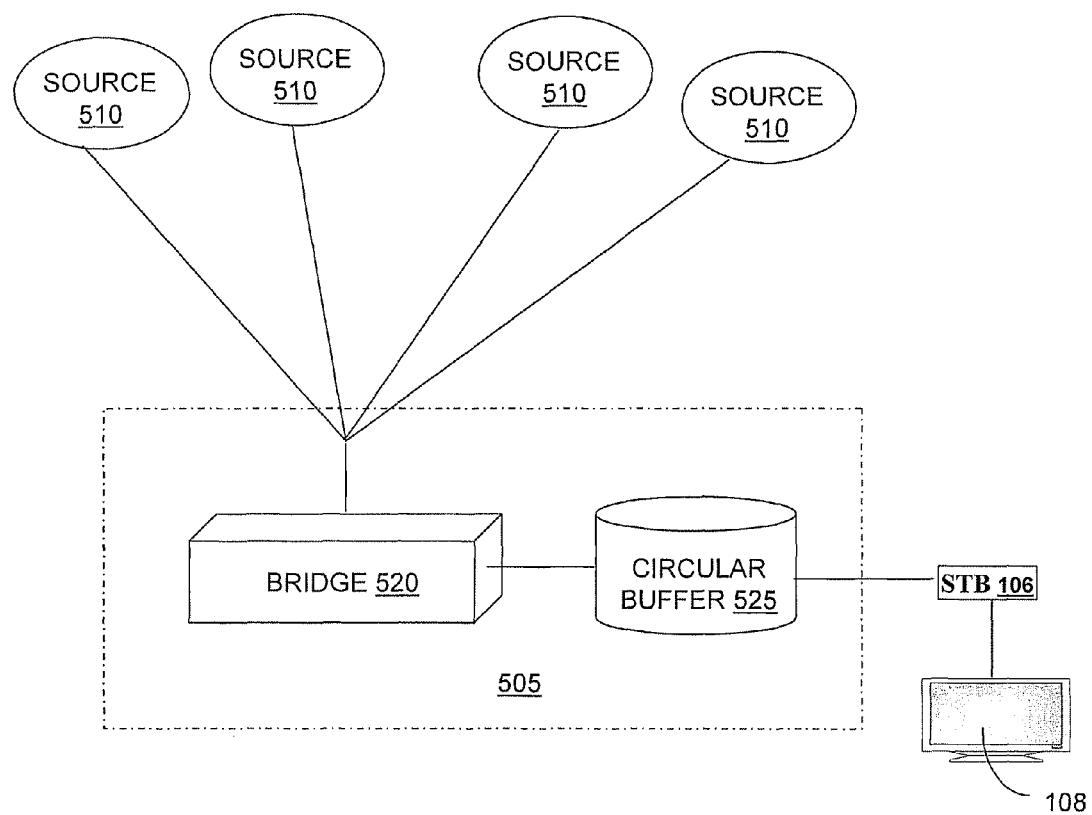
FIG. 5 depicts an illustrative embodiment of a communication system that provides media services.

FIG. 5 depicts an exemplary embodiment of a communication system 500 for delivering media content to communication devices associated with a user. The communication system 500 can represent an IPTV broadcast media system with multiple user display devices. Communication system 500 can be overlaid or operably coupled with communication systems 100-300 as another representative embodiment of said communication systems.

System 500 can include a network, such as ISP network 132 of FIG. 1, for delivery of the media content from the media sources 510 to the provider equipment (such as located at the video head office) and to the customer's equipment, such as the STB 106 having the display device 108 located at a residence. This exemplary embodiment shows a Network Management System 505 for delivery of multiple media content to the STB 106. The present disclosure contemplates various components and configurations being utilized for the delivery of the multiple media content, including centralized or distributed configurations, and/or master/slave arrangements. A number of network devices, including Ethernet switches, DSLAMs and other access devices can be utilized for transmitting the media content from the NMS 505 to the STB 106, as well as retrieving the media content from the media sources 510.

The NMS 505 can include a server, processor, controller or other computing device, and can utilize a number of connection structures for providing a communication link with the STB 106 and the media sources 510, including twisted pair lines, fiber lines and/or wireless connections. For example, a fiber optic coupling can include one GigE and ten GigE links connected to a fiber optic ring, such as a reconfigurable optical add-drop multiplexer (ROADM), which provide media services to a residence via a VHO comprising the NMS 505.

In one embodiment, the NMS 505 includes a bridge 520 that retrieves or otherwise obtains multiple media content from a plurality of media sources 510. In one embodiment, a portion of the media sources 510 can transmit the media content to the NMS 505 using communication protocols that are different from another portion of the media sources, such as a first media source that transmits a video by way of wireless protocol and a second media source that transmits another video by way of a DSL protocol. The media sources 510 can be independent systems storing or otherwise being able to provide media content to the NMS 505.

The bridge 520 can establish a session with a first of the media sources 510 for retrieving the media content and then can establish other sessions with the other media sources for retrieving other media content. The NMS 505 can establish and maintain a session with the STB 106 for delivery of the multiple media content that is being retrieved from the different media sources by the bridge 520. Each time a new media source 510 is being utilized for retrieving the media content, the bridge 520 can establish the session with the new media source while the NMS 505 maintains the session with the STB 106. In one embodiment, the bridge 520 can switch between different media sources in less than one hundred milliseconds. NMS 505 can provide multiple media content from a plurality of media sources using a single session between the NMS 505 and the STB 106. While the present disclosure shows NMS 505 delivering the multiple media content to a single STB 106, it should be understood by one of ordinary skill in the art that any number of STB's can be provided with this service. The distribution of the multiple media content can be on an individual user basis, such as at the request of a user associated with a single STB, and/or can be on a group basis, such as to be delivered to a plurality of STB's, including at the request of a group of users. In one embodiment, the multiple media content can include content that has different formats, such as video and audio-only. It should also be understood by one of ordinary skill in the art that portions of the media content can be retrieved from the same media source, such as a first media source that provides a plurality of episodes of a TV show and a second media source that provides one or more videos having information about the characters portrayed in the TV show.

In one embodiment, the NMS 505 can utilize a buffer, such as a circular buffer 525, as a repository for the packets of the multiple media content that are being received from the different media sources through the multiple sessions established between the NMS and the plurality of media sources. The bridge 520 can determine the bandwidth requirements for delivery of the media content, and can adjust the bandwidth, including bandwidth negotiations, to maintain streaming of the multiple media content to the STB 106.

The present disclosure contemplates that various components of system 500 can be separate components or one or more of these components can be incorporated together, such as the bridge 520 being a module of a server of the NMS 505 and the circular buffer 525 being maintained on a separate computing device which is accessed by the bridge 520. The present disclosure also contemplates other configurations for communication between the NMS 505 and the media sources 510 including intermediary communication devices coupling the NMS with the media sources, including intermediary devices that adjust the media content prior to delivery to the NMS, including transcoding.

Figure 6:
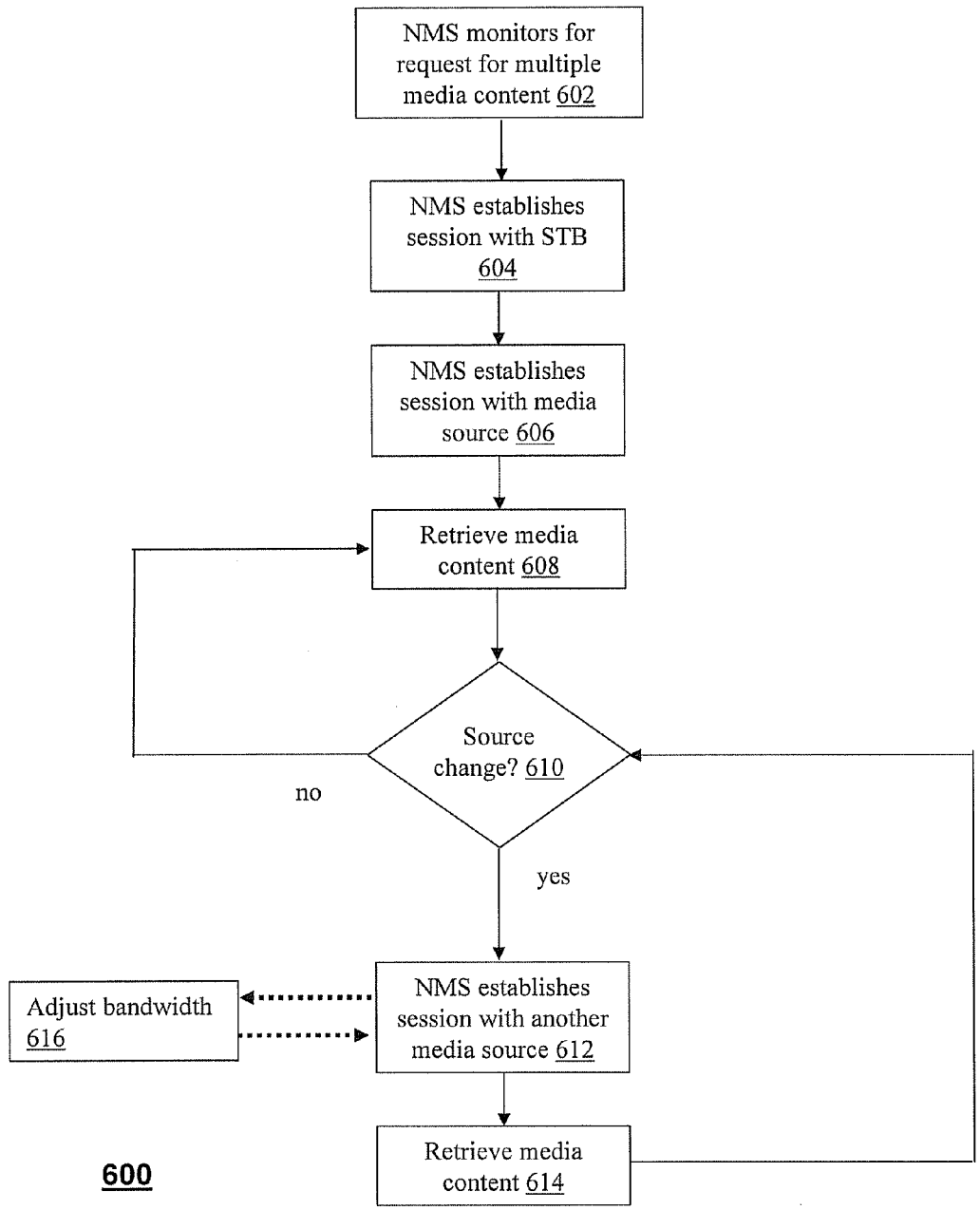
FIG. 6 depicts an illustrative embodiment of a method operating in portions of the communication systems of FIGS. 1-3 and 5.

FIG. 6 depicts an exemplary method 600 operating in portions of the communication systems 100, 200, 300, and/or 500. Method 600 has variants as depicted by the dashed lines. It would be apparent to an artisan with ordinary skill in the art that other embodiments not depicted in FIG. 6 are possible without departing from the scope of the claims described below.

Method 600 can begin with step 602 in which the NMS 505 monitors for a request for multiple media content from an STB. For example, the NMS 505 can receive a request for videos associated with an actor, where the videos can be retrieved from multiple media sources. In step 604, the NMS 505 can establish a delivery session with the STB for delivery of the multiple media content. In one embodiment, the session can be established as part of receipt of the request for the multiple media content. The delivery session can be based on various types of protocols, including SIP, and can include features associated with those protocols.

In step 606, the NMS 505 can establish a first session with a first media source for retrieving a portion of the multiple media content as in step 608. In step 610, the NMS 505 can determine if a change of media source is necessary to retrieve a second portion of the multiple media content. If a change of media source is necessary then in step 612, the NMS 505 can establish a second session with the second media source for retrieving a second portion of the multiple media content as in step 614. The establishment of the second session with the second media source can be performed by the NMS 505 while the session between the NMS 505 and the STB 106 is maintained. The media content can be streamed to the STB during this time. In one embodiment in step 616, the NMS 505 can adjust the bandwidth for delivery of the media content to the bridge 520 and/or the STB 106.

From the foregoing descriptions, it would be evident to an artisan with ordinary skill in the art that the aforementioned embodiments can be modified, reduced, or enhanced without departing from the scope and spirit of the claims described below. In one embodiment, a media format conversion can be applied by the NMS 505 to the media content when it is received from the different media sources and prior to delivery to the STB 106. For example, the adjustment of the format can be based on user profiles, user preferences, monitored user behavior or other criteria that facilitates the delivery and/or the presentation of the media content by the STB 106. In another embodiment, retrieval of the media content from the different media sources can take place during overlapping time periods.

These are but a few examples of the modifications that can be applied to the present disclosure without departing from the scope of the claims. Accordingly, the reader is directed to the claims for a fuller understanding of the breadth and scope of the present disclosure.

Other suitable modifications can be applied to the present disclosure without departing from the scope of the claims below. Accordingly, the reader is directed to the claims section for a fuller understanding of the breadth and scope of the present disclosure.

Figure 7:
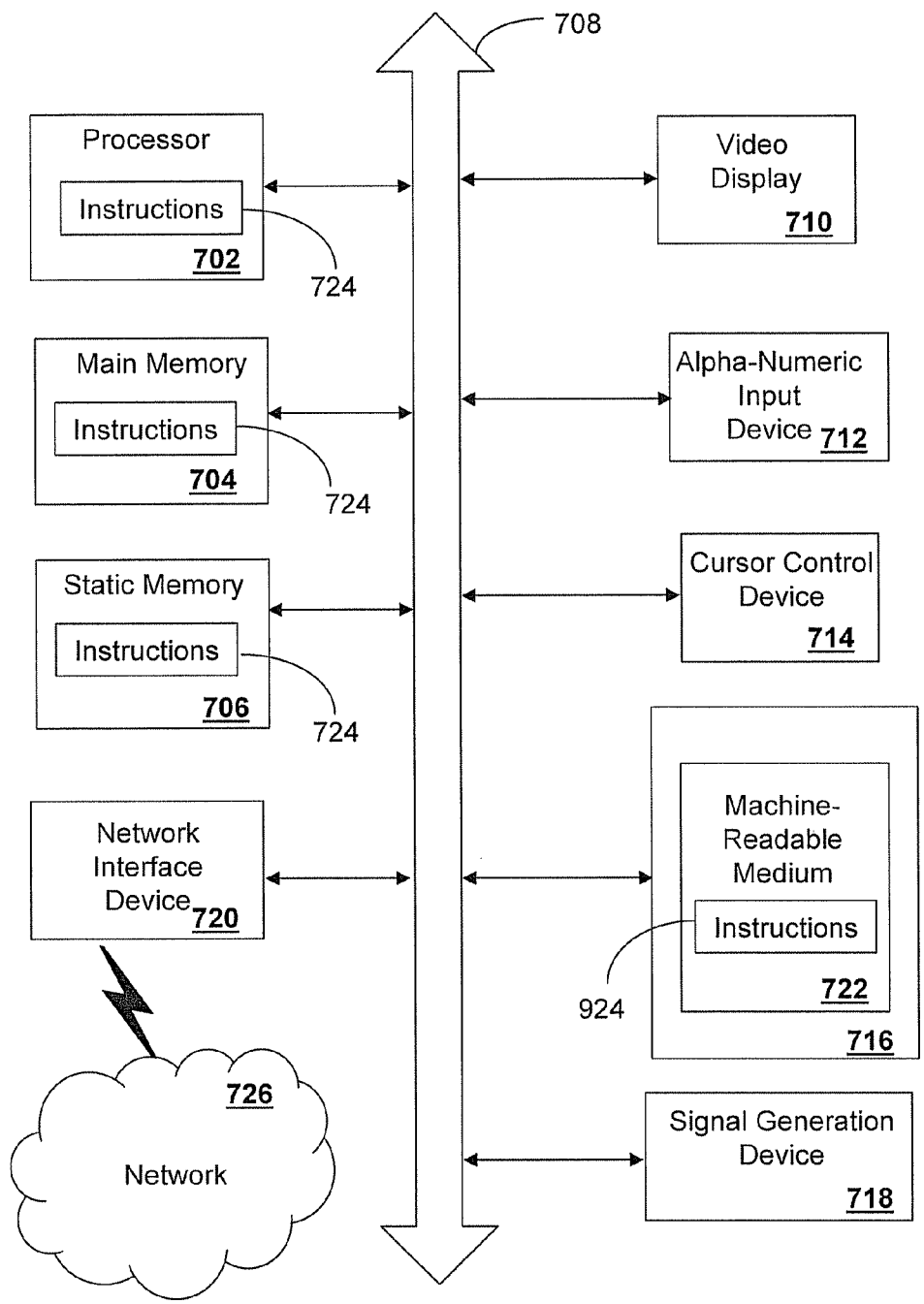
FIG. 7 is a diagrammatic representation of a machine in the form of a computer system within which a set of instructions, when executed, may cause the machine to perform any one or more of the methodologies discussed herein.

FIG. 7 depicts an illustrative diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (such as a central processing unit (CPU)), a graphics processing unit (GPU, or both), a main memory 704 and a static memory 706, which communicate with each other via a bus 708. The computer system 700 may further include a video display unit 710 (such as a liquid crystal display (LCD)), a flat panel, a solid state display, or a cathode ray tube (CRT)). The computer system 700 may include an input device 712 (such as a keyboard), a cursor control device 714 (such as a mouse), a disk drive unit 716, a signal generation device 718 (such as a speaker or remote control) and a network interface device 720.

The disk drive unit 716 may include a computer-readable medium 722 on which is stored one or more sets of instructions (such as software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the computer-readable medium 722 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, the storage medium comprising executable instructions, which when executed by a network management server cause the network management server to perform operations comprising:

monitoring for a request for media content to be delivered to a single set top box, the media content comprising multiple content from a plurality of media sources;

facilitating establishment of a single delivery session between a circular buffer and the single set top box for delivery of the media content in response to the request for media content;

facilitating establishment of a first retrieval session between a first media source of the plurality of media sources and a media bridge in communication with the circular buffer;

obtaining a first portion of the media content from the first media source using the first retrieval session according to a first communication protocol;

providing the first portion of the media content from the media bridge to the circular buffer;

generating a delivery signal to initiate streaming of the first portion of the media content to the single set top box from the circular buffer using the single delivery session;

determining, in response to the request for media content, that a change in media source of the plurality of media sources is necessary;

facilitating, while maintaining the single delivery session with the single set top box, establishment of a second retrieval session between a second media source of the plurality of media sources and the media bridge responsive to the determining that the change in media source of the plurality of media sources is necessary, wherein the first and second retrieval sessions overlap in time;

obtaining a second portion of the media content from the second media source using the second retrieval session according to a second communication protocol differing from the first communication protocol;

determining bandwidth requirements for delivery of the first and second portions of the media content via the single delivery session, wherein the single delivery session comprises features associated with the first and second communication protocols;

performing bandwidth negotiation to generate a negotiated bandwidth based on the bandwidth requirements, wherein the bandwidth negotiation is performed between the network management server and the plurality of media sources and is limited to the single delivery session for the single set top box;

adjusting bandwidth for the single delivery session based on the negotiated bandwidth without adjusting bandwidth for the first retrieval session;

providing the second portion of the media content from the media bridge to the circular buffer for delivery to the single set top box via the single delivery session without initiating another delivery session with the single set top box for the delivery of the second portion, wherein the second portion of the media content is delivered via the single delivery session subsequent to the first portion of the media content being delivered via the single delivery session; and adjusting a format of a portion of the media content prior to delivery to the single set top box, wherein the adjusting of the format is based on one of a user profile associated with the single set to box, preferences of a user, or a monitoring of a user behavior.

2. The non-transitory, machine-readable storage medium of claim 1, comprising executable instructions, which when executed by the network management server cause the network management server to stream the second portion of the media content to the single set top box from the circular buffer using the single delivery session, and wherein some of the media content is audio-only content.

3. The non-transitory, machine-readable storage medium of claim 2, wherein the first and second portions of the media content have a different format and are related content, and wherein the adjusting of the bandwidth for the single delivery session is performed without adjusting bandwidth for the second retrieval session.

4. The non-transitory, machine-readable storage medium of claim 2, wherein the operations further comprise:

performing additional bandwidth negotiation with one of the first media source or second media source, or a combination thereof to generate another negotiated bandwidth; and adjusting a bandwidth associated with one of the first retrieval session or the second retrieval session, or a combination thereof based on the other negotiated bandwidth.

5. A server comprising:

a memory storing executable instructions and being coupled to a circuit, which when executing the instructions, performs operations comprising:

receiving a request for media content;

determining, in response to the request, that the media content requires multiple retrieval sessions from multiple media sources of a plurality of media sources to a media bridge in communication with a circular buffer, wherein a first one of the multiple retrieval sessions comprises an associated first communication protocol and a second one of the multiple retrieval sessions comprising an associated second communication protocol differing from the first communication protocol;

facilitating, in response to the receiving of the request, establishment of a single delivery session between the circular buffer and a single set top box for streaming of media content thereto, wherein the media content comprises multiple content from the plurality of media sources obtained by the media bridge and provided to the circular buffer, and wherein the single delivery session comprises features associated with the first and second communication protocols;

obtaining, in response to the receiving of the request, the media content from the plurality of media sources by switching retrieval sessions with each of the plurality of media sources while maintaining the single delivery session;

determining bandwidth requirements for delivery of the media content via the single delivery session;

performing bandwidth negotiation to generate a negotiated bandwidth based on the bandwidth requirements, wherein bandwidth for the single delivery session is adjusted based on the negotiated bandwidth, wherein the bandwidth negotiation is performed between the server and the plurality of media sources and is limited to bandwidth associated with receipt of the multiple content by the single set top box;

providing the media content to the circular buffer by way of the media bridge for the streaming to the single set top box using the single delivery session without initiating another delivery session with the single set top box for the delivery of the media content; and adjusting a format of a portion of the media content prior to delivery to the single set top box, wherein the adjusting of the format is based on one of a user profile associated with the single set to box, preferences of a user, or a monitoring of a behavior of a user of the single set top box.

6. The server of claim 5, wherein the circuit is adapted to stream the media content from the circular buffer to the single set top box, wherein the media content is delivered via the single delivery session in order of retrieval.

7. The server of claim 6, wherein the circuit is adapted to monitor for a request for the media content.

8. The server of claim 7, wherein the request is from the single set top box.

9. The server of claim 5, wherein some retrieval sessions overlap in time.

10. A network element comprising:

a memory storing executable instructions; and a circuit coupled to the memory, which when executing the instructions performs operations comprising:

receiving a request for media content;

determining, in response to the request, that the media content requires multiple retrieval sessions from multiple media sources of a plurality of media sources, wherein a first one of the multiple retrieval sessions comprises an associated first communication protocol and a second one of the multiple retrieval sessions comprising an associated second communication protocol differing from the first communication protocol;

maintaining, in response to the receiving of the request, a single delivery session with a single set top box for streaming of media content thereto, wherein the media content comprises multiple content from the plurality of media sources, and wherein the single delivery session comprises features associated with the first and second communication protocols;

maintaining, in response to the receiving of the request, retrieval sessions for each of the plurality of media sources, wherein the circuit switches between the retrieval sessions to obtain the media content while maintaining the single delivery session;

providing the media content to a media bridge in communication with a buffer;

temporarily storing the media content in the buffer for the streaming to the single set top box using the single delivery session without initiating another delivery session with the single set top box for the delivery of the media content; and adjusting a format of a portion of the media content prior to the streaming to the single set to box, wherein the adjusting of the format is based on one of a user profile associated with the single set to box, preferences of a user, or a monitoring of a behavior of a user of the single set top box, wherein bandwidth for the single delivery session is adjusted based on a determination of bandwidth requirements for delivery of the media content via the single delivery session and based on a bandwidth negotiation and wherein the bandwidth negotiation is performed between the circuit and the plurality of media sources and is limited to bandwidth associated with receipt of the multiple content by the single set top box.

11. The network element of claim 10, wherein the circuit is adapted to receive a request for delivery of the media content from the single set top box.

12. The network element of claim 10, wherein the circuit is adapted to switch between the retrieval sessions in less than 100 ms.

13. The network element of claim 10, wherein a first portion of the media content has a different format from a second portion of the media content.

14. The network element of claim 10, wherein the buffer is a circular buffer.

15. A system comprising a server, wherein the server has access to a group of media sources, wherein a first retrieval session is provided between the server and a first media source of the group of media sources in response to receipt of a request for media content, the server determining, in response to the request, that the media content requires multiple retrieval sessions from multiple media sources of the group of media sources, the server receiving a first media content of multiple media content from the first media source during the first retrieval session, the server providing the first media content to a media bridge in communication with a buffer, wherein a second retrieval session, in response to the receipt of the request for media content, is provided between the server and a second media source of the group of media sources, the server receiving a second media content of the multiple media content from the second media source during the second retrieval session and providing the second media content to the media bridge,
wherein the first retrieval session comprises an associated first communication protocol and the second retrieval session comprises an associated second communication protocol differing from the first communication protocol,
wherein a single delivery session is established between the buffer and a single set top box for streaming of the multiple media content to the single set top box,
wherein the single delivery session comprises features associated with the first and second communication protocols,
wherein the first and second media content is obtained by the server via switching between the first and second retrieval sessions while the server maintains the single delivery session,
wherein bandwidth for the single delivery session is adjusted based on a determination of bandwidth requirements for delivery of the first and second media content via the single delivery session and based on a bandwidth negotiation,
wherein a format of a portion of the media content is adjusted prior to delivery to the single set top box, wherein the format is adjusted based on one of a user profile associated with the single set top box, preferences of a user, or a monitoring of a behavior of a user of the single set top box,
wherein the bandwidth negotiation is performed between the server and the first and second media sources and is limited to bandwidth associated with receipt of the multiple content by the single set top box, and
wherein the first and second media content are provided to the buffer for streaming to the single set top box using the single delivery session without initiating another delivery session with the single set top box for the delivery of the first and second media content.

16. The system of claim 15, wherein the buffer is a circular buffer.

17. A method, comprising:
utilizing a server comprising a processor for facilitating establishment of a single delivery session with a single set top box for delivery of media content, the media content comprising multiple content from a plurality of media sources;
receiving, by the server, a request for the media content;
determining, by the server, in response to the request, that the media content requires multiple retrieval sessions from multiple media sources of the plurality of media sources;
facilitating, by the server, in response to the request, establishment of a first retrieval session with a first media source of the plurality of media sources according to a first communication protocol;
obtaining, by the server, a first portion of the media content from the first media source using the first retrieval session;
providing, by the server, the first portion of the media content from a media bridge to a buffer;
generating, by the server, a first delivery signal for initiating streaming of the first portion of the media content to the single set top box from the buffer using the single delivery session;
facilitating, by the server, in response to the request, establishment of a second retrieval session with a second media source of the plurality of media sources according to a second communication protocol differing from the first communication protocol;
obtaining, by the server, a second portion of the media content from the second media source using the second retrieval session;
providing, by the server, the second portion of the media content from the media bridge to the buffer;
adjusting a format of a portion of the media content prior to delivery to the single set top box, wherein the adjusting of the format is based on one of a user profile associated with the single set to box, preferences of a user, or a monitoring of a behavior of a user of the single set top box; and
generating, by the server, a second delivery signal for initiating streaming of the second portion of the media content to the single set top box from the buffer using the single delivery session, wherein the single delivery session comprises features associated with the first and second communication protocols, wherein bandwidth for the single delivery session is adjusted based on a determination of bandwidth requirements for delivery of the first and second portions of the media content via the single delivery session and based on a bandwidth negotiation, wherein the bandwidth negotiation is performed between the server and the first and second media sources and is limited to bandwidth associated with receipt of the multiple content by the single set top box.

18. The method of claim 17, wherein the buffer is a circular buffer.

19. The method of claim 17, comprising adjusting a bandwidth associated with one of the first retrieval session, or the second retrieval session, or a combination thereof.

* * * * *